Oct. 14, 1947.  M. P. MATUSZAK  2,428,916
LIQUID-VAPORIZING UNIT
Filed Nov. 3, 1944

INVENTOR
MARYAN P. MATUSZAK
BY Hudson R. Young
ATTORNEY

Patented Oct. 14, 1947

2,428,916

UNITED STATES PATENT OFFICE 2,428,916

LIQUID-VAPORIZING UNIT

Maryan P. Matuszak, Bartlesville, Okla., assignor to Phillips Petroleum Company, a corporation of Delaware Application November 3, 1944, Serial No. 561,759

2 Claims. (Cl. 219—38)

1

This invention relates to liquid vaporizing units. In one of its more specific aspects it relates to liquid vaporizing units in which steady boiling and the production of many small bubbles of vapor are important. In such a specific aspect it relates to liquid vaporizing units in which a helical coil of heated wire inside a ceramic sleeve provides a suitable source for such small bubbles of vapor.

One object of this invention is to provide a unit for vaporizing liquid that has the advantages of causing uniform, continuous boiling with relatively less energy than is required by prior units, of avoiding the bumping that is ordinarily caused by superheating, and of obtaining a directed mixing or circulation of the heated liquid whereby stratification or establishment of local differences in composition is obviated.

Another object is to provide a simple and efficient heating unit suitable for use in any liquid vaporizing kettle or still and especially useful in vacuum distillation, on both a laboratory scale and a commercial scale.

Numerous other objects and advantages will be apparent upon reading the accompanying specification and drawings and the accompanying claims.

Difficulty has been experienced in heating liquids in fractional distillation columns, especially when the column is placed under a vacuum. The difficulties center around the heating unit. The heating units of the prior art cause bumping or the sudden formation and discharge of large pockets of vapor. Such bumping is caused by superheating and is due to the inability of the liquid to form small bubbles. Such improper heating often results in stratification or other establishment of local differences in composition of the materials by heating.

By providing a liquid vaporizing unit to carry out the above mentioned objects of the invention I have avoided the difficulties of the prior art and have produced a liquid vaporizing unit having the advantages of causing uniform boiling.

In the drawings:

Figure 3 is a schematic elevational view of a

2 vacuum distillation apparatus embodying another form of the present invention.

Figure 4:
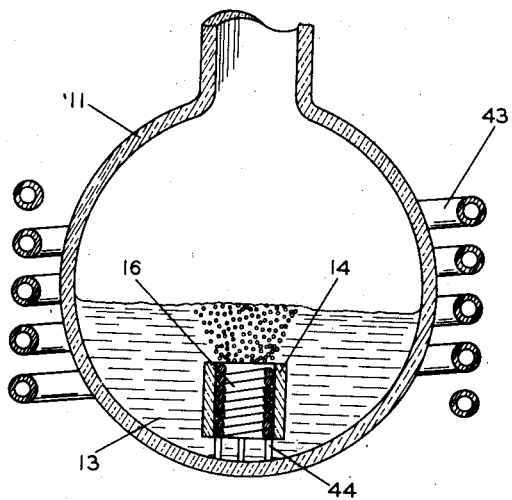
Figure 1:
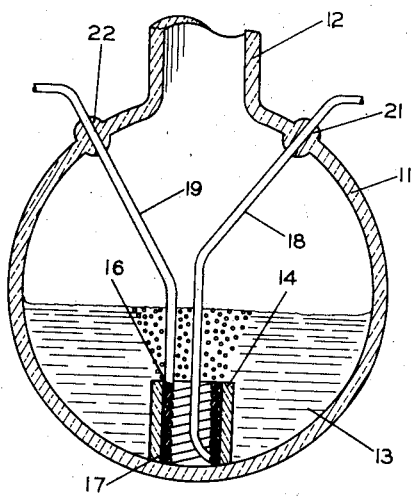
Figure 1 is an elevational view of a distillation column embodying one form of the invention, the column being in cross section with parts broken away.

Figure 4 is a view similar to Figure 1 of a third modified form of the invention.

In Figure 1 a glass kettle or distillation column 11 is shown in cross section with the upper portion above neck 12 broken away. As column 11 and neck 12 are conventional no further showing is believed necessary.

A liquid 13 which is being fractionally distilled in kettle 11 is shown in the lower portion of the kettle. This liquid may be a mixture of several substances having different boiling points.

A liquid vaporizing unit is provided for kettle 11 comprising in combination an outer cylindrical sleeve 14 of glass or other ceramic material which is non-conductive to electricity. It is preferable that the sleeve 14 be of heat resistant material. A closely wound vertical axis helical coil of electrical resistance wire 16 is provided inside of sleeve 14.

The adjacent turns of the wire in coil 16 preferably contact each other at least at a number of points and the exterior surface of these wires preferably contact sleeve 14 at a plurality of points forming a substantially helical prism shaped space 17 between the sleeve 14 and the coil of wire. From opposite ends of the helical coil 16 extend connection wires 18 and 19 which are preferably of less electrical resistance than the heating coil 16. Wires 18 and 19 are shown as passing directly through the glass walls of the kettle and sealed thereto, but obviously other well known means such as stuffing boxes may be employed to enable wires 18 and 19 to pass through the wall of the kettle 11. As shown in the drawing the glass of 11 may be molded or pressed against the wires 18 and 19 at points 21 and 22.

Figure 2:
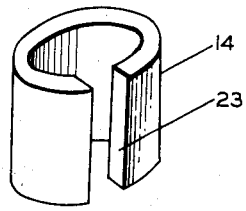
Figure 2 is a perspective view of one of the types of substantially cylindrical sleeves that may be employed in the practice of the invention.

As shown in Figure 2 sleeve 14 may be provided with a vertical slot 23 to aid in circulating the liquid through the heating coil. However in most cases it is preferred to not have a slot 23 but instead to have the sleeve 14 as a complete cylinder or ring.

Figure 3:
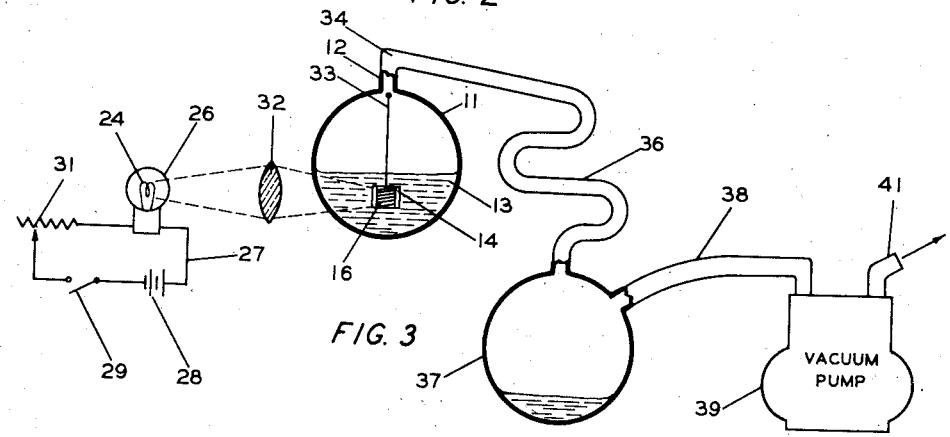

Figure 3 shows a second means of heating coil 16. In Figure 3 coil 16 does not have any connecting wires 18 or 19 and sleeve 14 is made of transparent glass. While in Figure 1 it was not necessary that kettle 11 be either transparent or made of glass, in Figure 3 it is necessary that kettle 11 be transparent.

In Figure 3 filament 24 of incandescent lamp 26 is heated by the passage of current through circuit 27 the current being provided by battery 28 and regulated by switch 29 and rheostat 31.

Radiant energy from filament 24 is concentrated by lens 32 on opaque coil 16. And very little of this energy is picked up by transparent kettle 11, liquid 13 or sleeve 14. Coil 16 is supported in liquid 13 by any suitable means such as a quartz filament 33.

Neck 12 of the kettle runs to the head 34 of the still and the usual condenser 36 and collection vessel 37 may be provided. While not necessary to the practice of the invention it is often desirable to apply a vacuum to vessel 11 by way of pipe 36 and pipe 38 and for this purpose a vacuum pump 39 with an exhaust 41 to the atmosphere may be provided.

In Figure 4 kettle 11 containing liquid 13 is surrounded by coil 43 and coil 43 is subjected to high frequency alternating currents. In kettle 11 sleeve 14 is supported on legs 44 and contains coil 16. Coil 16 may have its ends connected together in this figure, but this is not necessary and in Figure 4 they are shown not connected together.

Coil 43 produces a rapidly alternating electromagnetic field which does not heat kettle 11, liquid 13 nor sleeve 14, but which does set up eddy currents in coil 16 as coil 16 will conduct electric currents.

The liquid vaporizing unit will therefore be seen to comprise in its preferred form a closely wound vertical axis coil 16 of electrical resistance wire and a generally tubular sleeve 14 of a heat resistant dielectric, such as glass that fits snugly around the coil. The resulting combination when immersed in the liquid and supplied with heat energy, as by an electrical current passing through the coil through leads such as 18 and 19 of Figure 1, or inductively as in Figure 4 concentrates the heat because of the relatively poor heat conduction of the sleeve 14 and immediately establishes a vapor phase that persists in the space 17 between the closely wound coil 16 and the sleeve 14. As the coil is not perfect, small bubbles of vapor may pass between the turns of the coil and this formation of small bubbles obviates any possibility of superheating and consequent bumping. In addition the bubbles of vapor passing upwardly within the coil set up a definite directed thermosyphon circulation of the liquid that prevents stratification or establishment of local differences of composition.

The slit 23 shown in sleeve 14 in Figure 2 may be provided as a modification and such a slit may contribute to the circulation of the liquid when the surface of the liquid falls below the top of the coil 16, but it is not essential because the circulation effect continues even when a sleeve 14 is provided without any slit 23, provided the lower end of the coil is positioned at the lowermost point of the kettle 11 in which case the circulation is maintained until the liquid has become practically completely vaporized.

When the electrical energy or heat is supplied to the coil inductively as in Figure 4, or by radiation as in Figure 3, then the electrical leads 18 and 19 shown in Figure 1 may be omitted. When omitted some other means such as quartz thread 33 or legs 44 should be provided to maintain the coil with its axis in a vertical position.

The vaporizing unit of this invention has been used in a number of Podbielniak-type columns and in similar devices. In use, it is characterized by a marked steadiness and uniformity of boiling that is exceedingly desirable for close fractionation. It maintains boiling at any desired rate and is especially useful for low rates at which ordinary means of supplying heat, such as external heaters or internal unjacketed, loosely wound heating coils, completely fail to maintain steady boiling and instead periodically cause bumping and overload or flood the column.

Illustrative of the low energy required to maintain boiling by means of this invention, it was observed that a liquid mixture of four-carbon hydrocarbons in a Podbielniak-type gas-analytical column could be maintained indefinitely in a gently boiling condition without supplying any electrical energy whatever to the coil. In this instance, the relatively slight amount of heat entering the kettle by radiation and by conduction along the electrical leads to the coil was so concentrated by the sleeve and by virtue of the circulation effect that the boiling persisted indefinitely without passage of any electrical current through the coil. This instance indicates that, if desired, the supplying of heat to the liquid being vaporized, boiled, or distilled may be in part or even in toto by any of the conventional means; the function of the vertical-axis sleeved coil in the liquid then becomes simply that of maintaining continuously a vapor phase within the liquid and of maintaining continuously a directed circulation of the liquid.

Any desired number of the units of this invention may be used together to mutiply the rate of vaporization.

Consistent with its manner of operation, the liquid-vaporizing unit may vary considerably in size, in shape, and in the dimensions of its several cooperating parts. For example, although the tubular sleeve or jacket or sheath is usually most conveniently of circular cross-section, it may be of triangular, quadrangular, or other polygonal cross-section. It is advantageous for the sleeve and coil to be of such diameters that the space within the coil becomes substantially bridged, as it were, by vapor bubbles, whereby an air-lift action promoting the above-mentioned directed circulation or pumping of the liquid is effected by forced upward movement within the coil of slugs or portions of liquid entrapped between successive bubbles. To extend this pumping action, the sleeve may be prolonged for any desired distance above the upper end of the coil; in some specific applications, as in vacuum distillation of some liquids, it may advantageously extend even above the general upper surface of the liquid in the still, though for many purposes it usually ends below the liquid surface. The exact dimensions of the unit may vary in accordance with the specific requirements of the liquid being vaporized, as ascertained by trial; for most liquids, an internal diameter for the coil within the range of 2 to 5 mm. is generally most satisfactory, as being within the range that promotes the air-lift action by coalescence of vapor to form bubbles of suitable size for substantially bridging the space within the coil. The length of the coil itself may vary quite widely, such as between say one and twenty or more times the internal diameter of the coil; ordinarily a length between about two and five times the diameter is preferred.

Formal changes may be made in the specific embodiment of the invention described without departing from the spirit or substance of the broad invention, the scope of which is commensurate with the appended claims.

Having described my invention, I claim:

1. A liquid vaporizing unit adapted to produce small bubbles of vapor from a liquid upon heating in said liquid whereby bumping during boiling of said liquid is substantially eliminated, comprising in combination a substantially dielectric sleeve adapted to be at least partially immersed in said liquid, a coil in said sleeve, and means to heat said coil, adjacent turns of said coil substantially contacting each other and also substantially contacting said sleeve, whereby the spaces between the adjacent turns of said coil and said sleeve form vapor collecting pockets upon sufficient heating of said coil, and the spaces between the adjacent turns of said coil provide exits for small bubbles of vapor driven from said vapor pockets by vapor pressure due to heating of said coil.

2. A liquid vaporizing unit adapted to produce small bubbles of vapor from a liquid upon heating in said liquid whereby bumping during boiling of said liquid is substantially eliminated, comprising in combination a substantially dielectric sleeve adapted to be at least partially immersed in said liquid, a coil in said sleeve, and means to heat said coil, adjacent turns of said coil substantially contacting each other and also substantially contacting said sleeve, whereby the spaces between the adjacent turns of said coil and said sleeve form vapor collecting pockets upon sufficient heating of said coil, and the spaces between the adjacent turns of said coil provide exits for small bubbles of vapor driven from said vapor pockets by vapor pressure due to heating by said coil, in which the internal diameter of the coil is from 2 to 5 mm. and the length of the coil is between 1 and 20 times said diameter.

MARYAN P. MATUSZAK.

REFERENCES CITED

The following references are of record in the file of this patent:

UNITED STATES PATENTS

| Number | Name | Date |
|---|---|---|
| 248,428 | Edison | Oct. 18, 1881 |
| 932,242 | Berry | Aug. 24, 1909 |
| 1,515,729 | Clement | Nov. 18, 1924 |
| 2,167,471 | Auerbach | July 25, 1939 |
| 1,552,387 | Marchesseault | Sept. 1, 1925 |
| 2,179,838 | Young | Nov. 14, 1939 |

Certificate of Correction

Patent No. 2,428,916.  October 14, 1947.

MARYAN P. MATUSZAK

It is hereby certified that error appears in the printed specification of the above numbered patent requiring correction as follows: Column 6, line 6, claim 2, for "exists" read *exits*; and that the said Letters Patent should be read with this correction therein that the same may conform to the record of the case in the Patent Office.

Signed and sealed this 3rd day of February, A. D. 1948.

[SEAL]

THOMAS F. MURPHY,
*Assistant Commissioner of Patents.*